United States Patent
Groe

(10) Patent No.: US 6,980,786 B1
(45) Date of Patent: Dec. 27, 2005

(54) ADAPTIVE RECEIVER SYSTEM THAT ADJUSTS TO THE LEVEL OF INTERFERING SIGNALS

(75) Inventor: John B. Groe, Poway, CA (US)

(73) Assignee: Sequoia Communications Corp., San Diego, CA (US)

( * ) Notice: Subject to any disclaimer, the term of this patent is extended or adjusted under 35 U.S.C. 154(b) by 510 days.

(21) Appl. No.: 10/051,761

(22) Filed: Jan. 16, 2002

Related U.S. Application Data

(60) Provisional application No. 60/261,730, filed on Jan. 16, 2001.

(51) Int. Cl.[7] .................................................. H04B 1/26
(52) U.S. Cl. .................... 455/314; 455/260; 455/226.1; 455/234.1
(58) Field of Search ......................... 455/232.1, 234.1, 455/226.1, 226.2, 245.1, 313, 318, 338, 334, 455/255, 258, 263, 260, 261, 314, 323, 63.1, 455/295, 234.2, 67.13, 296; 375/345, 327

(56) References Cited

U.S. PATENT DOCUMENTS

| | | | | |
|---|---|---|---|---|
| 5,440,586 A | * | 8/1995 | Den Braber | ................ 455/260 |
| 5,465,406 A | * | 11/1995 | Whitecar et al. | ......... 455/234.2 |
| 5,548,594 A | * | 8/1996 | Nakamura | ................ 455/245.1 |
| 5,548,616 A | * | 8/1996 | Mucke et al. | ............. 455/234.1 |
| 6,223,061 B1 | * | 4/2001 | Dacus et al. | ................. 455/574 |
| 6,324,387 B1 | * | 11/2001 | Kamgar et al. | ........... 455/234.1 |
| 2004/0203548 A1 | * | 10/2004 | Kim | ......................... 455/67.13 |

* cited by examiner

*Primary Examiner*—Lana Le

(57) ABSTRACT

Adaptive receiver system that adjusts to the level of interfering signals. An adaptive system is provided for use with a radio receiver to adapt to interfering signals associated with a received RF signal. The radio receiver includes a LNA to receive the RF signal and produce an amplified signal that is coupled to a down-converting mixer that produces a mixer output. A peak detector is coupled to receive the mixer output to produce a peak signal. An integrator is coupled to the peak detector to receive the peak signal and produce an integrated signal and a mixer is coupled to receive the integrated signal and a transmit power indicator to produce a current control signal that is coupled to the LNA. The current control signal is used to control a bias current of the LNA, so that cross modulation associated with the received RF signal is reduced.

13 Claims, 3 Drawing Sheets

"Prior Art"

ADAPTIVE RECEIVER SYSTEM THAT ADJUSTS TO THE LEVEL OF INTERFERING SIGNALS

CROSS REFERENCE TO RELATED APPLICATIONS

This application claims the benefit of priority from a copending U.S. Provisional Application entitled, "ADAPTIVE RECEIVER THAT ADJUSTS TO THE LEVEL OF INTERFERING SIGNALS" filed on Jan. 16, 2001, and having Application No. 60/261,730.

FIELD OF THE INVENTION

This invention relates generally to radio receiver systems, and more particularly, to a radio receiver that adapts to the level of interfering signals to improve system performance.

BACKGROUND OF THE INVENTION

FIG. 1 shows a diagram of a typical radio receiver 100. The receiver 100 includes a switched-gain low noise amplifier (LNA), a phase-locked loop (PLL) that includes a voltage-controlled oscillator (VCO) and drives a radio frequency down-converting mixer 102, a bandpass filter (BPF), a variable gain amplifier (VGA), an I/Q demodulator, a low pass channel-select filter, and analog to digital (A/D) converter. The radio receiver uses an automatic gain control (AGC) loop to adjust the switched-gain LNA and VGA in a way that compensates for variations in the power of the received signal.

The performance of the radio receiver depends on the operating bias of key circuits such as the LNA, RF down-converting mixer, and VCO. This is simply because the available output power from these circuits depends on their supply voltage ($V_{supply}$) and bias current ($I_{bias}$), i.e., $$P_{out} \leq V_{supply} I_{bias}$$

while the compression point, $P_{-1dB}$, and the third order intercept point, $IP_3$, track the available output power. As a result, to improve linearity generally requires increasing circuit's operating bias.

Radio receivers are designed to meet minimum performance requirements. These requirements ensure the radio will operate in most situations—even weak-signal environments subject to strong interfering signals that can lead to cross modulation, reciprocal mixing, and intermodulation problems. But this means key circuits in the radio receiver oftentimes require a high operating bias, even though the likelihood of these difficult situations is low. As a result, the radio receiver performs much better and operates at a higher bias current than needed.

Most RF circuits use feedback to set their gain and performance. In these circuits, the operating bias defines the available output power and linearity. The operating current does not, however, affect the gain of the circuit. Therefore, it is practical to adjust the operating current for these circuits without disturbing the AGC loop and any power control algorithms. Since power consumption is a critical issue in portable radios, it would be advantageous to a system that adjusts the operating current of the radio based on the performance needed.

SUMMARY OF INVENTION

The present invention includes a system that provides an adaptive receiver that adjusts to the level of interfering signals, minimizing operating current while avoiding problems due to cross modulation, reciprocal mixing, and intermodulation distortion. In one embodiment, the system operates to detect the presence of cross modulation, blocking, or intermodulation distortion in a received signal and adjusts the operating bias of key circuits, including, but not limited to, the LNA, RF down-converting mixer, and VCO.

In one embodiment included in the present invention, a radio receiver is provided that comprises at least one amplifier to receive radio signals, and a control circuit coupled to the at least one amplifier, wherein the control circuit adjusts the operation of the at least one amplifier based on the received radio signals.

In another embodiment included in the present invention, an adaptive system is provided for use with a radio receiver to adapt to interfering signals associated with a received RF signal. The radio receiver includes a LNA to receive the RF signal and produce an amplified signal that is coupled to a down-converting mixer that produces a mixer output. The adaptive system comprises a peak detector coupled to receive the mixer output to produce a peak signal, an integrator coupled to the peak detector to receive the peak signal and produce an integrated signal and a mixer coupled to receive the integrated signal and a transmit power indicator to produce a current control signal that is coupled to the LNA to control a bias current of the LNA, wherein cross modulation associated with the received RF signal is reduced.

In another embodiment included in the present invention, a method is provided for providing an adaptive system for use with a radio receiver to adapt to interfering signals associated with a received RF signal. The radio receiver includes an LNA to receive the RF signal and produce an amplified signal that is coupled to a down-converting mixer that produces a mixer output. The method comprises the steps of deriving a peak signal from the mixer output, integrating the peak signal to produce an integrated signal, mixing the integrated signal and a transmit power indicator to produce a current control signal, and controlling a bias current of the LNA with the current control signal, wherein cross modulation associated with the received RF signal is reduced.

DESCRIPTION OF THE DRAWINGS

The foregoing aspects and the attendant advantages of this invention will become more readily apparent by reference to the following detailed description when taken in conjunction with the accompanying drawings wherein.

DETAILED DESCRIPTION

The present invention includes a radio receiver system that adjusts the operating bias of key circuits to minimize power consumption but still provides the needed performance. Thus, various embodiments included in the present invention are described in detail in the following text.

Figure 1:
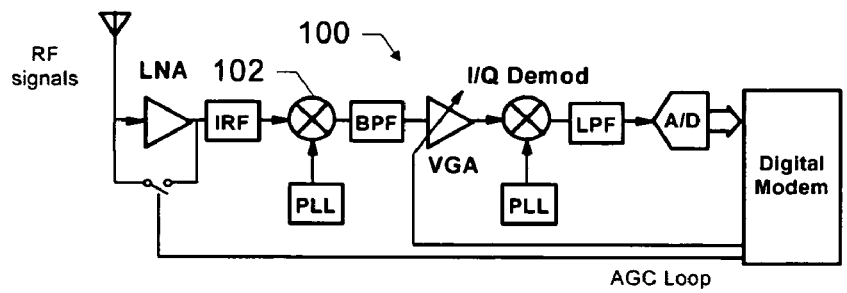
FIG. 1 shows a diagram of a typical radio receiver.
Figure 2:
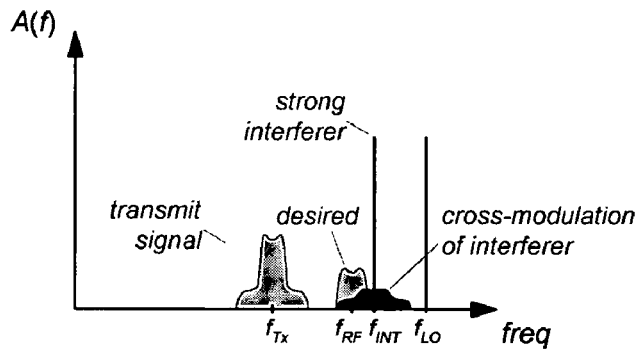
FIG. 2 shows a graph that illustrates the phenomenon of cross modulation in a LNA.

FIG. 2 shows a graph that illustrates the phenomenon of cross modulation in the LNA. This phenomenon—caused by nonlinear operation of the LNA—translates modulation from the transmit signal to an interfering signal. The performance of the radio receiver becomes degraded when the newly-modulated interfering signal overlaps the desired received signal. The linearity of the LNA depends on its operating bias; therefore, a high operating bias is needed to reduce cross modulation.

Cross modulation depends on the power of the transmit signal and the frequency spectrum of the received signal at the LNA input. The problem surfaces when the received signal ($f_{RX}$) includes a strong interfering signal ($f_{INT}$) located close in frequency to the desired received signal, i.e.

$$f_{int}=f_{RX}<B_{TX}$$

where $B_{TX}$ is the bandwidth of the transmit signal.

Figure 3:
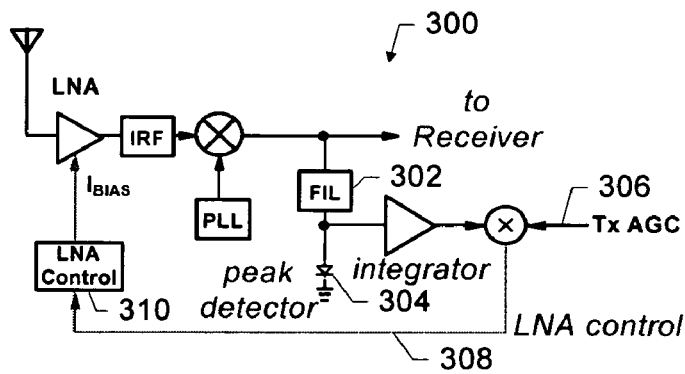
FIG. 3 shows a diagram of a control network constructed in accordance with the present invention for use in a radio receiver to analyze cross modulation problems and adjust the operating bias of the LNA.

FIG. 3 shows a diagram of a control network 300 constructed in accordance with the present invention for use in a radio receiver to analyze conditions for cross modulation, and in turn, to properly set the operating bias of the LNA. A filter 302 passes signals with close in frequency to the frequency of the down-converted desired received signal to a peak detector 304. An active or passive filter is suitable; although, a buffer amplifier may be required for certain filter structures. The peak detector 304 can be a simple diode or any suitable circuit to measure the energy passed by the filter 302. The peak detector 404 preferably should be "fast-attacking" and "slow-decaying." As a result, small-scale radio propagation effects will be ignored.

The transmit signal level is readily available from the power control signal applied to the radio transmitter. This control signal 306 is multiplied by the peak detector measurement to form an indicator signal 308 that represents the likelihood of desensitizing cross modulation by the LNA. In turn, the control network 310 uses this data to properly bias the LNA.

The LNA control network 310 is unique in that it minimizes the operating current in the LNA while avoiding desensitization due to cross modulation. The control network 310 may comprise any suitable circuit to control the operating bias of the LNA. For example, the control network 310 may comprise simple analog circuitry and can be integrated with the LNA. Furthermore, such a control network does not force changes to the digital demodulator. Therefore, the presently described embodiment of the invention operates to analyze the incoming radio signal to determine if the conditions exist for cross modulation, and to use the result to adjust the operating bias of the LNA accordingly.

Figure 4:
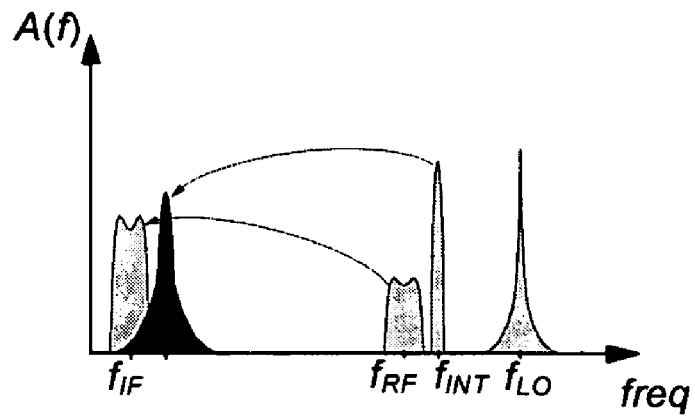
FIG. 4 shows a graph that illustrates the phenomena of reciprocal mixing in the RF down-converting mixer due in part to LO phase noise.

FIG. 4 shows a graph that illustrates the phenomenon of reciprocal mixing in the RF down-converting mixer. This phenomenon—caused by high levels of local oscillator (LO) phase noise—spreads the frequency spectrum of each received signal. The performance of the radio receiver becomes degraded when the newly spread interfering signals overlap the desired received signal. The spreading depends on the spectrum of the LO phase noise, which in some part depends on the output power of the VCO. This is due in part because the output power of the VCO increases faster than the noise level. As such, a high operating bias is generally needed to raise the output power of the VCO, lowering LO phase noise and reducing the level of reciprocal mixing.

Figure 5:
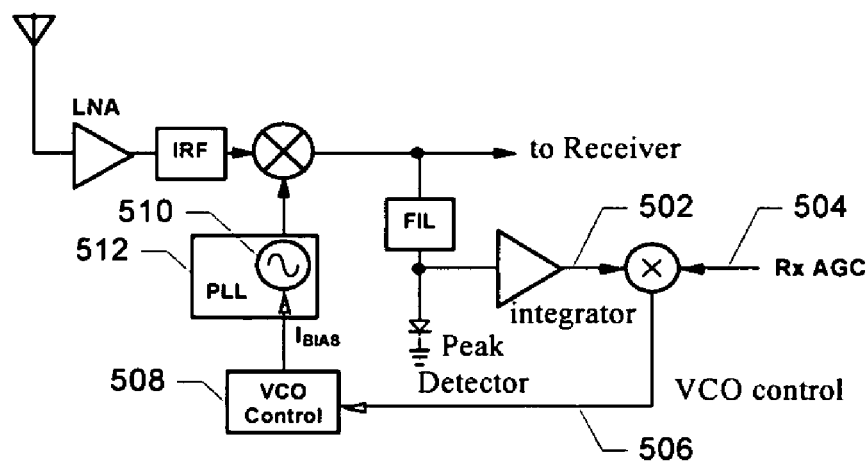
FIG. 5 shows a diagram of a control network constructed in accordance with the present invention for use in a radio receiver to analyze the conditions for reciprocal mixing and adjust the operating bias of the VCO.

Reciprocal mixing depends on the frequency spectrum of the LO phase noise and of the received signal. The problem surfaces when the received signal ($f_{RX}$) includes a strong interfering signal ($f_{INT}$) located close in frequency to the desired received signal. This condition is found using the peak detector and measurement circuitry described earlier and shown in FIG. 5. The peak detector measurement 502 is multiplied by the gain signal 504 applied to the receiver to produce a VCO control signal 506 that represents the likelihood of reciprocal mixing problems. In turn, the signal 506 is used to set the operating bias and output power of the VCO 510 via the VCO control circuit 508. For example, the control circuit 508 may comprise simple analog circuitry and can be integrated with the PLL 512.

Figure 6:
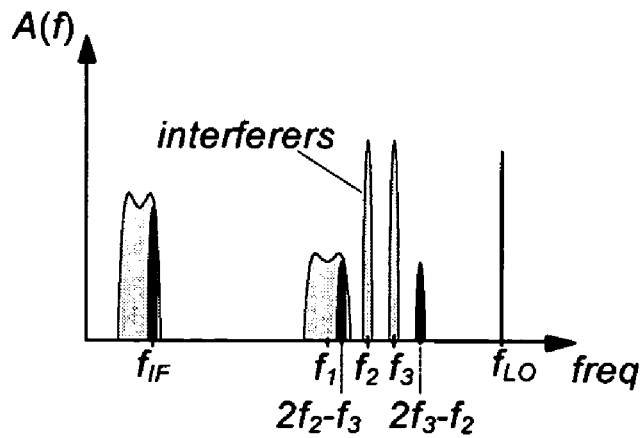
FIG. 6 shows a graph that illustrates the intermodulation distortion in the RF down-converting mixer.

FIG. 6 shows a graph that illustrates intermodulation distortion in the RF down-converting mixer. Intermodulation distortion is caused by nonlinear operation in the mixer, which converts strong interfering signals to distortion products. The intermodulation distortion products are troublesome when they overlap the received signal and desensitize the radio receiver. These products are due to odd ordered distortion, which decrease with order. In other words, the third order distortion products are strongest, followed by the fifth order distortion products, and so on. The troublesome third order products are generated by interfering signals ($f_1$ and $f_2$) that satisfy the following conditions $$|2f_1-f_2|=f_{RF}\pm^{BRX}/2 \text{ or } |2f_2-f_1|=f_{RF}\pm^{BRX}/2$$

where $f_{RF}$ is the carrier for the received signal with bandwidth BRX. The linearity of the mixer depends on its operating bias; therefore, a high operating bias is needed to reduce intermodulation distortion.

Figure 7:
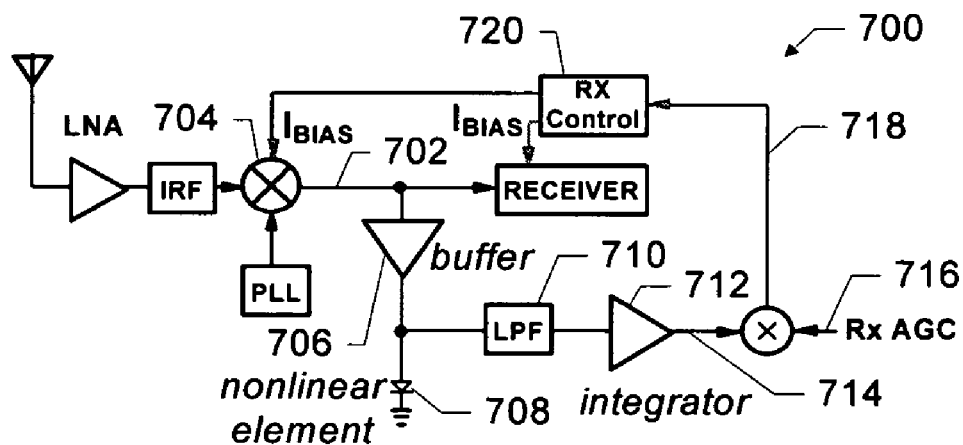
FIG. 7 shows a diagram of the control network constructed in accordance with the present invention for use in a radio receiver to analyze intermodulation distortion problems and adjust the operating bias of various circuits within the radio receiver, including the down-converting mixer.

FIG. 7 shows a diagram of the control network 700 constructed in accordance with the present invention that analyzes the spectrum of the received band and in turn property sets the operating bias of the RF down-converting mixer and subsequent circuits in the radio receiver system. The output 702 of the down-converting mixer 704 is buffered by the buffer 706—comprised of simple emitter follower or source follower amplifiers in one embodiment—and applied to a nonlinear circuit, such as diode 708. A filter 710 passes in-band signal energy to a "fast-attack/slow-decay" integrator 712. The resulting output 714 from the integrator 712 is a measure of the in-band power after the received band has been processed nonlinearly. Note that this measurement also includes the received signal power itself.

The above measurement 714 is compared to the receiver AGC signal 716 that conveys the RSSI information to produce a control signal 718. Any difference is due to the in-band intermodulation distortion produced by the nonlinear processing. The control signal 718 is in turn used to set the operating bias in the RF down-converting mixer 704 as well as subsequent circuits in the radio receiver system, via the control circuit 720. For example, the control circuit 720 may comprise simple analog circuitry and can be integrated with the down-converting mixer 704.

The control network 700 is unique in that it minimizes the operating current in the mixer 704 and subsequent receiver circuits. It can be processed straightforwardly using simple analog or digital techniques. Furthermore, implementation of the control network 700 does not force changes to the digital demodulator.

Since all radio receivers employ the above identified key circuits whose linearity is dependant upon operating bias—including LNAs, VCOs, and down-converting mixers—one or more embodiments included in the present invention are suitable for use in any radio architecture, including heterodyne, direct conversion, low-IF, digital-IF and sub-sampled receivers.

The present invention provides an adaptive receiver system that adjusts the operating bias and related its performance to the level of interfering signals. The embodiments described above are illustrative of the present invention and are not intended to limit the scope of the invention to the particular embodiments described. Accordingly, while several embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

What is claimed is:

1. A radio receiver having an LNA to receive an RF signal and produce an amplified signal that is coupled to a down-converting mixer that produces a mixer output, and the radio receiver comprises:

a peak detector coupled to receive the mixer output to produce a peak signal;

an integrator coupled to the peak detector to receive the peak signal and produce an integrated signal;

a second mixer coupled to receive the integrated signal and a transmit power indicator to produce a current control signal that is coupled to the LNA to control a bias current of the LNA, wherein cross modulation associated with the received RF signal is reduced.

2. A radio receiver having an LNA to receive an RF signal and produce an amplified signal that is coupled to a down-converting mixer that produces a mixer output, and the radio receiver comprises:

a peak detector coupled to receive the mixer output to produce a peak signal;

an integrator coupled to the peak detector to receive the peak signal and produce an integrated signal; a second third mixer coupled to an output of the integrator and a receiver gain control signal to produce a VCO current control signal that is coupled to a VCO associated with a PLL that drives the down-converting mixer, wherein the reciprocal mixing associated with the received RF signal is reduced by adjustment of the VCO associated with the PLL.

3. An adaptive system for use with a radio receiver to adapt to interfering signals associated with a received RF signal, the radio receiver includes an LNA to receive the RF signal and produce an amplified signal that is coupled to a down-converting mixer that produces a mixer output, the adaptive system comprises:

a peak detector coupled to receive the mixer output to produce a peak signal;

an integrator coupled to the peak detector to receive the peak signal and produce an integrated signal; and a second mixer coupled to receive the integrated signal and a transmit power indicator to produce a current control signal that is coupled to the LNA to control a bias current of the LNA, wherein cross modulation associated with the received RF signal is reduced.

4. The adaptive system of claim 3, further comprising a filter coupled to receive the mixer output of the downconverting mixer and produce a filtered output that is coupled to the peak detector.

5. The adaptive system of claim 3, further comprising an LNA control circuit coupled to the second mixer to receive the current control signal and produce a LNA control signal that is coupled to the LNA to control a bias current of the LNA, wherein cross modulation associated with the received RF signal is reduced.

6. An adaptive system for use with a radio receiver to adapt to interfering signals associated with a received RF signal, the radio receiver includes an LNA to receive the RF signal and produce an amplified signal that is coupled to a down-converting mixer that produces a mixer output, the adaptive system comprises:

a peak detector coupled to receive the mixer output to produce a peak signal;

an integrator coupled to the peak detector to receive the peak signal and produce an integrated signal; and a second mixer coupled to the integrated signal and a receiver gain control signal to produce a VCO current control signal that is coupled to a VCO associated with a PLL that drives the down-converting mixer, wherein reciprocal mixing associated with the received RF signal is reduced by adjustment of the VCO associated with the PLL.

7. The adaptive system of claim 6, wherein the VCO control current signal is coupled to the VCO associated with the PLL via a VCO control circuit.

8. The adaptive system of claim 6, wherein the peak detector comprises a diode element.

9. An adaptive system for use with a radio receiver to adapt to interfering signals associated with a received RF signal, the radio receiver includes an LNA to receive the RF signal and produce an amplified signal that is coupled to a down-converting mixer that produces a mixer output, the adaptive system comprises:

a nonlinear element coupled to receive the mixer output to produce a peak signal;

an integrator coupled to the non-linear element to produce an integrator output; and a second mixer coupled to receive the integrator output and a receiver power indicator to produce a receive control signal.

10. The adaptive system of claim 9, wherein the receive control signal is coupled to a receive control circuit, and wherein an output of the receive control circuit is coupled to the down-converting mixer to adjust the down-converting mixer in order to reduce intermodulation distortion.

11. A method for providing an adaptive system for use with a radio receiver to adapt to interfering signals associated with a received RF signal, the radio receiver includes an LNA to receive the RF signal and produce an amplified signal that is coupled to a down-converting mixer that produces a mixer output, the method comprising steps of:

deriving a peak signal from the mixer output;

integrating the peak signal to produce an integrated signal;

mixing the integrated signal and a transmit power indicator to produce a current control signal; and controlling a bias current of the LNA with the current control signal, wherein cross modulation associated with the received RF signal is reduced.

12. A method for providing an adaptive system for use with a radio receiver to adapt to interfering signals associated with a received RF signal, the radio receiver includes an LNA to receive the RF signal and produce an amplified signal that is coupled to a down-converting mixer that produces a mixer output, the method comprising steps of:

deriving a peak signal from the mixer output;

integrating the peak signal to produce an integrated signal;

mixing the integrated signal and a receive power indicator to produce a VCO control signal; and controlling a VCO based on the VCO control signal, wherein the VCO is associated with a PLL coupled to the down-converting mixer, and wherein the reciprocal mixing associated with the received RF signal is reduced by adjustment of the VCO associated with the PLL.

13. A method for providing an adaptive system for use with a radio receiver to adapt to interfering signals associated with a received RF signal, the radio receiver includes an LNA to receive the RF signal and produce an amplified signal that is coupled to a down-converting mixer that produces a mixer output, the method comprising steps of:

deriving a peak signal from the mixer output;

integrating the peak signal to produce an integrated signal;

mixing the integrated signal and a receive power indicator to produce a receive control signal; and controlling the down-converting mixer based on the receive control signal, wherein intermodulation distortion associated with the received RF signal is reduced.

* * * * *